Nov. 19, 1968  T. D. SANDERS  3,412,232

RAILWAY CAR HEATING AND VENTILATING SYSTEMS

Filed Dec. 31, 1963  2 Sheets-Sheet 1

WITNESSES

INVENTOR
Terry D. Sanders
BY
ATTORNEY

Nov. 19, 1968     T. D. SANDERS     3,412,232
RAILWAY CAR HEATING AND VENTILATING SYSTEMS
Filed Dec. 31, 1963     2 Sheets-Sheet 2

United States Patent Office 3,412,232
Patented Nov. 19, 1968

3,412,232
**RAILWAY CAR HEATING AND
VENTILATING SYSTEMS**
Terry D. Sanders, Penn Hills Township, Pa., assignor to
Westinghouse Electric Corporation, East Pittsburgh,
Pa., a corporation of Pennsylvania
Filed Dec. 31, 1963, Ser. No. 334,809
8 Claims. (Cl. 219—202)

ABSTRACT OF THE DISCLOSURE

A heating and ventilating system for railway or rapid transit cars including motor-driven fans for circulating air in the car, electric heaters and dampers for admitting outside air. The speed of the fan motors and the position of the dampers are thermostatically controlled and energization of the heaters is controlled by thermostats. Means are provided for energizing at least one heater with thermostatic control when the car is not in service, and means are provided for deenergizing the fan motors in case of failure of one or more motors.

---

This invention relates, generally, to heating and ventilating systems and, more particularly, to systems for controlling the heating and ventilating of railway or subway cars which must operate under a variety of different conditions.

Subway cars, or other railway cars, are often heated by electric heaters and ventilated by electrically driven fans and dampers which control the amount of air drawn into the car from outside the car. Prior systems for controlling the operation of the heaters, the fan motors and the dampers have been undesirably complicated and expensive.

An object of this invention is to provide a simplified and improved heating and ventilating system using a minimum number of components.

Another object of the invention is to coordinate the operation of the fan motors, the heaters and the dampers to improve the efficiency of the heating and ventilating system.

A further object of the invention is to provide a protective system for a plurality of series-connected fan motors.

Still another object of the invention is to provide for operating dampers directly by thermostats.

A still further object of the invention is to control the speed of fan motors directly by thermostats.

Other objects of the invention will be explained fully hereinafter or will be apparent to those skilled in the art.

In accordance with one embodiment of the invention, the energization of the fan motors and the heaters for each car of a subway train is controlled by a train line relay energized from a conductor extending throughout the train. The speed of operation of the fan motors is controlled by resistors shunted directly by thermostats which operate successively at different temperatures. The operation of the heaters and the damper motors is also controlled by thermostats. The fan motors are protected by a balanced voltage scheme and a relay or a circuit breaker which cooperate to disconnect the motors without affecting the operation of the heaters. Provision is made for maintaining heat in the car when the car is out of service, to prevent condensation and freezing of moisture.

For a better understanding of the nature and objects of the invention, reference may be had to the following detailed description, taken in conjunction with the accompanying drawings, in which.

Figure 1:
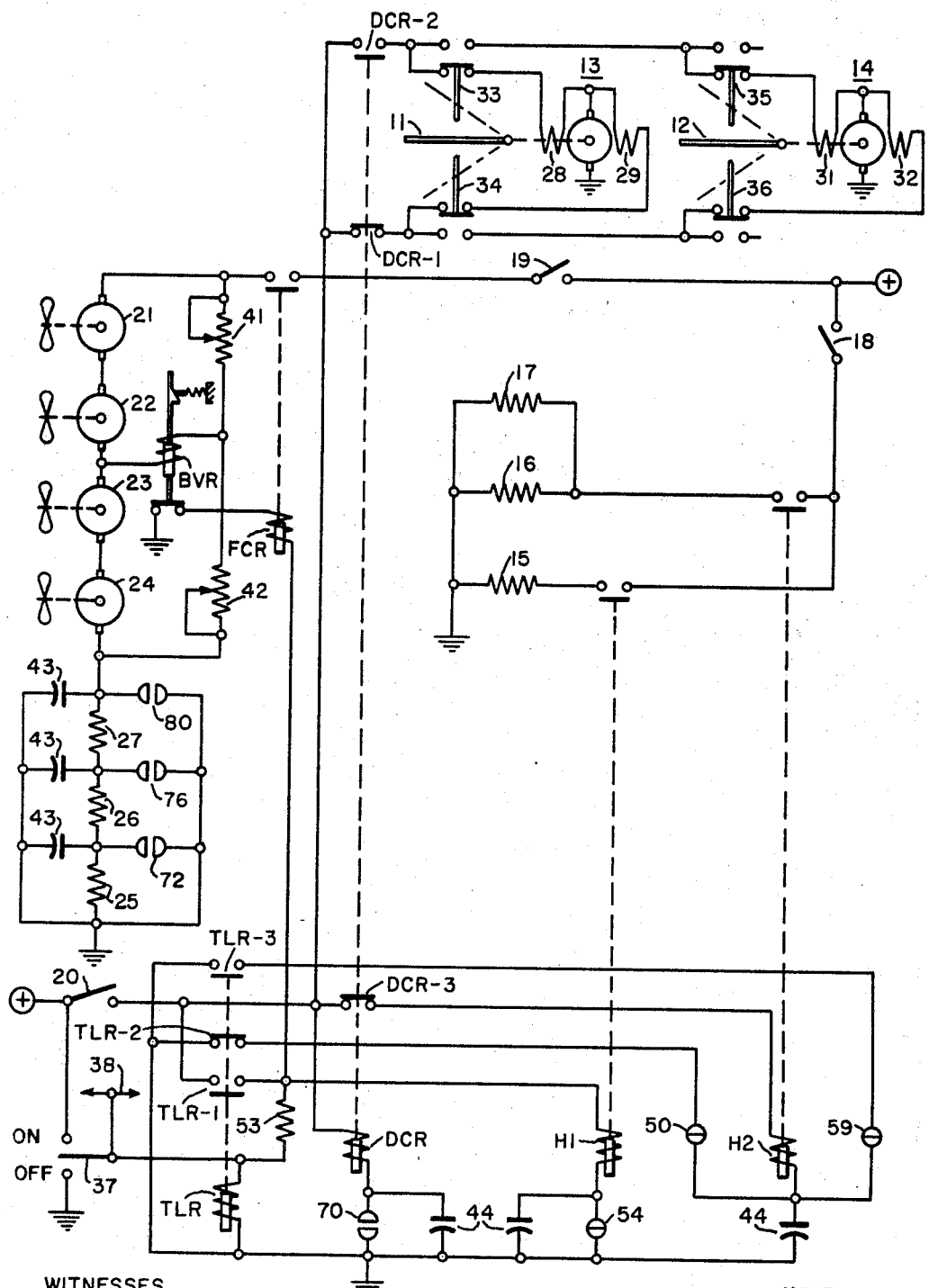
FIG. 1 is a diagrammatic view of a heating and ventilating system embodying the principal features of the invention.

Referring to the drawing, and particularly to FIG. 1, the heating and ventilating system shown therein is suitable for conditioning the air in a railway or subway car which may be operated in a train of cars. In accordance with the usual practice, the operation of the train is controlled by a motorman located in the head car of the train. Each car is so equipped that it may be utilized as the head car.

The system shown in FIG. 1 comprises dampers 11 and 12 for regulating the amount of air drawn into the car from the outside, motors 13 and 14 for operating the dampers 11 and 12, respectively, a plurality of electrically energized heaters 15, 16 and 17 for heating the air within the car, manually operable switches 18, 19, and 20, and a plurality of fan motors 21, 22, 23 and 24, each one of which drives a fan for circulating the air within the car. The fan motors are of the series type and they are connected in series-circuit relation with resistors 25, 26 and 27 which are utilized to control the speed of the fan motors in accordance with the temperature of the air within the car as will be described more fully hereinafter.

The damper motor 13 has two field windings 28 and 29, one of which is energized for each direction of rotation of the motor. Likewise, the damper motor 14 has two field windings 31 and 32, one of which is energized for each direction of rotation of the motor. The energization of the respective field windings, and hence the direction of operation of the damper motors, is controlled by a damper control relay DCR. The travel of the damper 11 in the open and the closed directions is controlled by limit switches 33 and 34, respectively. Likewise, the travel of the damper 12 in the open and the closed directions is controlled by limit switches 35 and 36, respectively. The limit switches also cause sequential operation of the dampers. Thus, the damper 11 is opened prior to the opening of the damper 12 and the damper 11 is closed prior to the closing of the damper 12. It will be understood that additional dampers may be provided and connected in the system in the manner of the dampers 11 and 12.

The energization of the heater 15 is controlled by an electrically operated heater switch H1. Likewise, the energization of the heaters 16 and 17 is controlled by an electrically operated heater switch H2. A manually operable motorman's cab switch 37 is provided for controlling the energization of a train line conductor 38 which extends through the car and is connected to a similar conductor in the adjacent car by a suitable connector or jumper. The train line conductor is utilized as a control conductor for the heating and ventilating system, and energizes a train line relay TLR which is provided in each car.

In order to protect the fan motors against fault conditions, a balanced voltage relay BVR of the latching type is provided. The actuating coil of the relay BVR is connected to a point between the motors 22 and 23 and to a point between resistors 41 and 42 which are connected in series across the four fan motors 21 to 24. The resistors 41 and 42 are of equal resistance. Thus, when the four fan motors are operating under normal conditions the coil of the relay BVR is connected across two points which are at the same potential. However, if a fault develops in one of the motors, there is an unbalance in the voltage across the coil of the relay and its contact members are opened to deenergize the actuating coil of a fan control relay FCR, thereby opening the contact member of this relay to disconnect the fan motors from the power source. The relay BVR must be reset by releasing its latch in order to restore the fan motors to service.

The fan control is entirely separate from the heat control and is under the control of thermostats 72, 76 and 80. The thermostats are of a type having contact members which are suitable for directly shunting the resistors 25, 26 and 27 from the fan motor circuit, thereby controlling the speed of the fan motors. As shown, the motors have four operating speeds which are controlled by the thermostats, in accordance with the temperature of the air in the car. Thus, by way of example, the motors may operate at 240 r.p.m. when the air is below 72°. When the temperature is between 72° and 76°, the contact members of the thermostat 72 are closed to shunt the resistor 25 and the motors then operate at 450 r.p.m. When the temperature is between 76° and 80°, the contact members 76 are closed to shunt the resistor 26 and the motors operate at 650 r.p.m. When the temperature is above 80°, the contact members 80 are closed to shunt the resistor 27 and the fans run at 860 r.p.m. In accordance with the usual practice, capacitors 43 may be provided across the contact members of the thermostats to reduce sparking. It will be understood that the particular speeds and temperatures mentioned are illustrative only, and the motors may operate at any desired speeds at any desired temperatures.

The operation of the heating switch H1 is controlled by a thermostat having contact members 54 connected in the circuit for the actuating coil of the switch H1. Likewise, the operation of the heating switch H2 is controlled by a thermostat having contact members 59 connected in the circuit of the actuating coil of the switch. An additional thermostat having contact members 50 is also provided for controlling the switch H2 as will be described hereinafter. The operation of the damper control relay DCR is also controlled by a thermostat having contact members 70 connected in the circuit for the actuating coil of the relay. Capacitors 44 are connected across the contact members of the thermostats to reduce sparking.

Figures 2, 3:
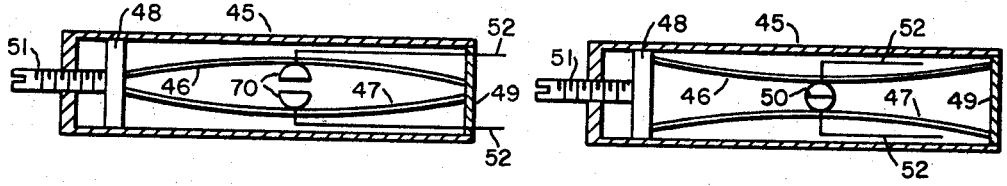
FIG. 2 is a somewhat diagrammatic view, in section, of a thermostat having normally open contact members utilized in the system shown in FIG. 1.
FIG. 3 is a view, similar to FIG. 2, of a thermostat having normally closed contact members.

The thermostats utilized in the present system are preferably of a type having contact members suitable for opening and closing circuits carrying relatively large amounts of current at 600 volts DC. Such a thermostat is commercially available under the trade name "Thermoswitch." A thermostat of this type having normally open contact members is shown in FIG. 2. It comprises a generally cylindrical housing 45 which is composed of a metal, such as brass, having a relatively high coefficient of expansion. The contact members 70 are carried by two strips of metal 46 and 47, such as stainless steel, having a lower coefficient of expansion. The two metal strips 46 and 47 are fastened between an adjustable member 48 and a fixed end member 49. The position of the member 48 may be so adjusted by means of a screw 51 that at a predetermined temperature the strips 46 and 47 are bowed outwardly to separate the contact members 70. When the temperature increases and the housing 45 expands, the members 48 and 49 are separated to stretch the strips 46 and 47 to close the contact members 70. The contact members may be connected to an external circuit by means of conductors 52 which extend through the end member 49.

A similar thermostat having normally closed contact members 50 is shown in FIG. 3. It is similar in structure to the thermostat shown in FIG. 2, with the exception that the strips 46 and 47 are bowed inwardly to close the contact members 50 at a predetermined temperature. When the temperature is increased to expand the housing 45, the strips 46 and 47 are stretched to open the contact members 50.

In order that the functioning of the foregoing apparatus may be more clearly understood, the operation of the system will now be described in more detail. Assuming that the manual switches 18, 19 and 20 are closed, the system is put in operation by actuating the motorman's cab switch 37 to the "on" position. This energizes the train line conductor 38 from a source of direct current control power, and causes the train line relay TLR in each car to be actuated. The closing of contact members TLR–1 establishes a holding circuit for the relay TLR through a resistor 53. To deenergize the control, the cab switch 37 is moved to the "off" position, thereby short-circuiting the coil of the relay TLR and dropping out the relay.

The closing of the contact members TLR–1 also establishes an energizing circuit for the actuating coil of the fan control relay FCR, thereby closing its contact members to connect the fan motors to a power source in series with the resistors 25, 26 and 27. The power source for the fan motors and heaters is preferably the main power supply to the car which, in the case of subway cars, is usually 600 volts DC. As explained hereinbefore, the speed of the fan motors is controlled by the thermostats 72, 76 and 80 in accordance with the temperature of the air in the car.

As also explained hereinbefore, the relays BVR and FCR cooperate to protect the motors against fault conditions. If a fault develops in one of the motors, the motors are disconnected from the power source by the operation of the relays BVR and FCR without affecting the operation of the heaters and the dampers. The energizing circuit for the fan control relay FCR extends through contact members of the relay BVR. Thus, when the relay BVR is operated by an unbalanced voltage condition its contact members are open to deenergize the relay FCR which drops out to disconnect the motors from the power source.

When the damper control relay DCR is deenergized its contact members DCR–1 are closed to establish a circuit through the limit switch 34, the field winding 29 and the armature of the motor 13 to operate the damper 11 to its fully closed position where it actuates the limit switch 34. When the switch 34 is actuated, it interrupts the circuit for the motor 13 and establishes a circuit through the limit switch 36, the field winding 32 and armature of the motor 14 to operate the damper 12 to its fully closed position, thereby actuating the limit switch 36 to stop the motor 14. The contact members of the normally open thermostat 70 are adjusted to close at a desired temperature such as 70°. Therefore, at temperatures below 70° the coil of the relay DCR remains deenergized and the dampers remain closed. At temperatures above 70°, the contact members 70 are closed to energize the coil of the relay DCR, thereby opening its contact members DCR–1 and closing its contact members DCR–2. The closing of the contact members DCR–2 establishes a circuit through the limit switch 33, the field winding 28 and armature winding of the motor 13 to operate the motor in a direction to open the damper 11. When the damper 11 is fully opened, the limit switch 33 is actuated to interrupt the circuit for the motor 13 and establish a circuit through the limit switch 35, the field winding 31 and armature of the motor 14 to cause this motor to open the damper 12 and operate the limit switch 35 which stops the motor. In this manner both dampers are sequentially operated to their fully opened position to admit air to the car for cooling and ventilation. The dampers remain open so long as the temperature is above 70°. If the temperature falls below 70°, the thermostat contacts 70 open to deenergize the relay DCR and establish the circuit previously described for closing the dampers. It will be obvious that additional dampers may be provided if desired with their motors connected for sequential operation in the manner described.

The contact members of the normally closed thermostat 54 are adjusted to be open above a desired temperature such as 54°, and the contact members of the thermostat 59 are open above 59°. Thus, if the temperature falls to 59°, the thermostat contacts 59 close, and the actuating coil of the heater switch H2 is energized to close its contact members and connect the heaters 16 and 17 to the power source. Since the circuit for the coil of the switch H2 extends through normally closed contact members DCR–3 of the relay DCR, this relay must be deenergized and the dampers closed in order for the heater switch H2 to be energized. If the temperature falls to 54°, the coil of the heater switch H1 is energized, thereby closing its contact members to connect the heater 15 to the power source. When the heaters are energized the fan motors are running at minimum speed to recirculate the air in the car.

When the train line relay TLR is deenergized the control is automatically set to provide heat in the car while it is not in service. The relay DCR is deenergized if the temperature is below 70°, thereby causing the dampers to be closed. The opening of the contact members TLR–1 prevents the heater switch H1 from being closed. The control of the heater switch H2 is transferred from the thermostat 59 to a thermostat 50 by the closing of contact members TLR–2 and the opening of contact members TLR–3 on the train line relay TLR. Should the temperature drop below 50°, the contact members of the thermostat 50 are closed to establish an energizing circuit for the coil of the heater switch H2 which extends from positive through the switch 20, the contact members DCR–3 of the relay DCR, the coil of the switch H2, the contact members 50 and contact members TLR–2 of the train line relay TLR to ground. Thus, the heater switch H2 is closed to energize the heaters 16 and 17 and supply approximately two-thirds heat. If, during the lay up period the temperature rises above 50°, H2 will open and shut off heat. This circuit will continue to cycle as needed to prevent moisture condensation and freezing in the car during the lay up period of the car. It will be noted that the relay DCR is energized independently of the train line relay TLR. Thus, the dampers are controlled during lay up by the thermostat 70 to be closed in cold weather to conserve heat and to be open in warm weather to admit fresh air.

If desired, the dampers may be operated by thermostats directly through an actuating mechanism instead of by means of damper motors. Thermostats are available on the market in which each unit is capable of 60 pounds force with a stroke of approximately ⅜ of an inch. These thermostats are reliable in operation and have been utilized for many years in the automobile and trucking industry. Each thermostat has a piston member which is moved outwardly in a straight line when the temperature of the thermostat is increased above a predetermined temperature. Since the piston is not retracted upon a decrease in temperature, it is necessary to provide means for moving the piston inwardly when the temperature decreases.

Figure 4:
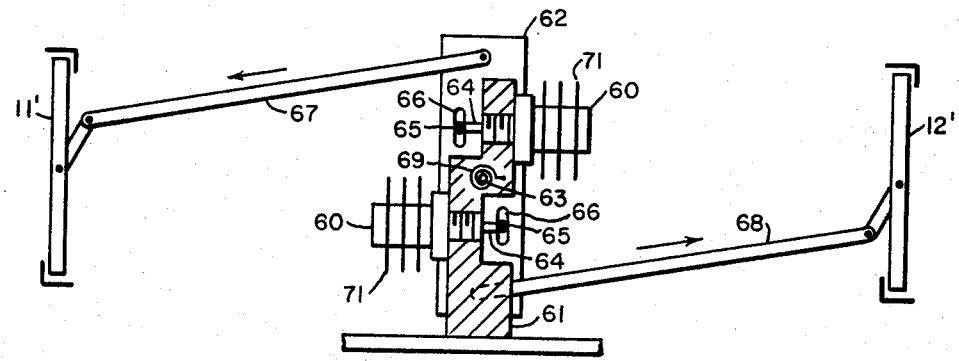
FIGS. 4 and 5 are views, partly in elevation and partly in section, of two different thermostat-actuated mechanisms for operating dampers which may be utilized in place of the damper motors shown in FIG. 1.

As shown in FIG. 4, two such thermostats 60 may be mounted on a fixed support member 61. A bar 62 is mounted on the support member to rotate about a transverse axis 63. A piston 64 of each thermostat has a roller 65 on its outer end which is disposed in a slot 66 in the bar 62. A linkage mechanism 67 connects one end of the bar 62 to a damper 11' and a similar linkage mechanism 68 connects the other end of the bar 62 to a damper 12'. When the pistons 64 of the thermostats 60 are moved outwardly by an increase in temperature, the bar 62 is rotated counterclockwise to move the linkages 67 and 68 in the direction indicated by the arrows and open the dampers 11' and 12'. A spiral spring 69 is provided for rotating the bar 62 in the opposite direction when the temperature decreases, thereby closing the dampers and moving the pistons 64 inwardly in the thermostats 60. A heat sink 71 may be provided on each thermostat 60 for better sensitivity to air temperature changes. The slots 66 permit the pistons 64 to move in a straight line as the bar 62 is being rotated. The two thermostat units are utilized to increase reliability.

Figure 5:
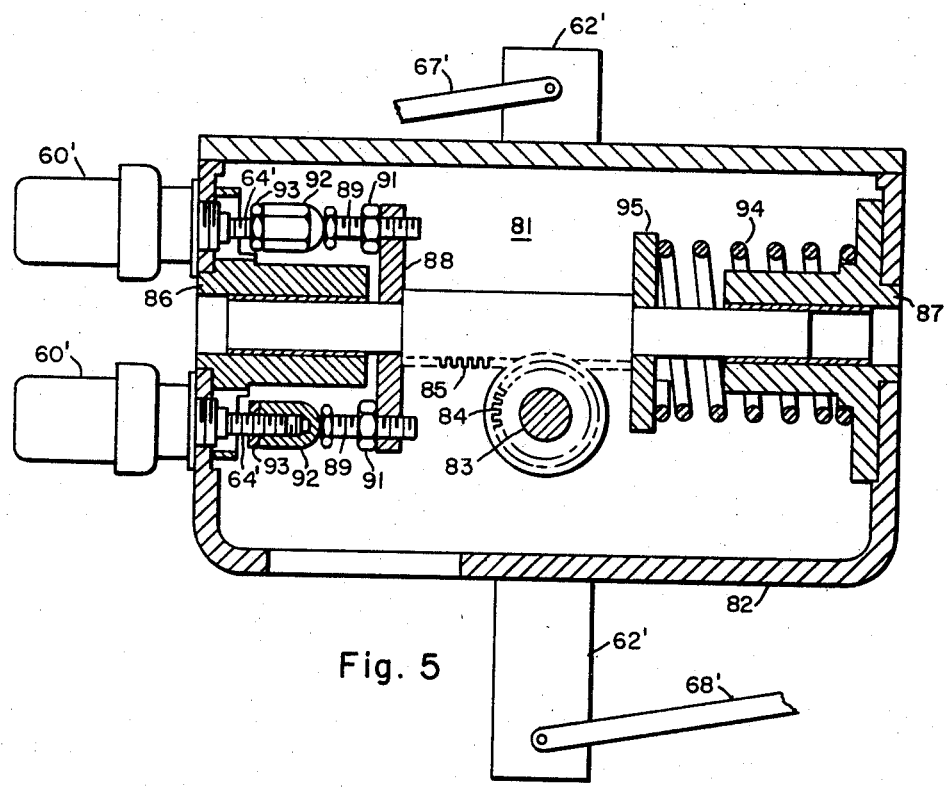

In the modification shown in FIG. 5, a rack and gear mechanism 81 is mounted inside a housing 82 for transmitting the force of thermostats 60' to rotate the bar 62' and operate the dampers through linkage mechanisms 67' and 68'. The thermostats 60' are mounted on one end of the housing 82. The bar 62' is secured to one end of a shaft 83 which is rotatably mounted in the housing on suitable bearings. The shaft 83 is rotated by a gear 84 which is driven by a rack 85. The rack 85 is slidably disposed in bearing housings 86 and 87 mounted in the housing 82. A cross member 88 is attached to the rack 85. Two screws 89 are adjustably threaded into the cross member 88. Lock nuts 91 are provided on the screws 89. A nut 92 having a rounded end portion is adjustably threaded onto each piston 64' of each one of the thermostats 60'. Lock nuts 93 are provided for the adjustable nuts 92. The rounded portion of each nut 92 engages the head of one of the screws 89.

Thus, when the pistons 64' are moved downwardly by an increase in the temperature of the thermostats 60' the cross bar 88 and the rack 85 are moved to the right to drive the gear 84 and rotate the bar 62' clockwise, thereby opening the dampers by means of the linkage mechanisms 67' and 68'. A compression spring 94 is disposed around the bearing housing 87 to engage a washer 95 on the rack 85, thereby moving the rack to the left when the temperature of the thermostats 60' decreases. In this manner the bar 62' is rotated in one direction to open the dampers above a predetermined temperature and in the opposite direction to close the dampers below said temperature.

The mechanisms shown in FIGS. 4 and 5 provide for operating the dampers without requiring electric motors and relays for controlling the operation of the motors, and may be used in the system of FIG. 1 instead of the motors 13 and 14 and relay DCR. This has the advantage that the position of the dampers is modulated by air temperature, whereas with motor control the dampers are either fully open or fully closed.

From the foregoing description, it is apparent that the invention provides a simplified and improved heating and ventilating system which is particularly suitable for conditioning the air in subway cars. Provision is made for protecting the fan motors without affecting the operation of the electric heaters. When the car is out of service sufficient heat is supplied to prevent moisture condensation and freezing.

While preferred embodiments of this invention have been disclosed herein, many modifications thereof are feasible. This invention then is not to be restricted except insofar as is necessitated by the spirit and scope of the prior art.

I claim as my invention:

1. A heating and ventilating system for a car comprising a plurality of electric heaters, a plurality of motor-driven fans for circulating air in the car, a relay on the car, means for energizing said relay, means responsive to energization of the relay for effecting connection of the fan motors to a power source for operation of the fans, said relay including contact means for establishing circuits for energizing said heaters from the power source when the relay is energized, temperature responsive means for controlling said energizing circuits to effect energization of the heaters in response to predetermined temperatures in the car, said relay also including contact means for establishing an energizing circuit for at least one of said heaters when the relay is deenergized, and separate temperature responsive means for controlling said last-mentioned energizing circuit in response to a predetermined temperature in the car.

2. A heating and ventilating system as defined in claim 1 including temperature responsive means for changing the speed of the fan motors in response to predetermined temperatures in the car.

3. A heating and ventilating system as defined in claim 1 including damper means for controlling admission of air to the car, and means responsive to the temperature in the car for effecting operation of the damper means between open and closed positions.

4. A heating and ventilating system for a car comprising a plurality of electric heaters, a plurality of motor-driven fans for circulating air in the car, relay means on the car for effecting connection of the fan motors and the heaters to a power source, temperature responsive means for controlling energization of the heaters in response to the temperature in the car, said fan motors being connected in series, and means responsive to unbalance in the voltages across the fan motors for effecting deenergization of the fan motors independently of the relay means.

5. A heating and ventilating system for a car comprising a plurality of electric heaters, a plurality of motor-driven fans for circulating air in the car, relay means on the car for effecting connection of the fan motors and the heaters to a power source, temperature responsive means for controlling energization of the heaters in response to the temperature in the car, said fan motors being connected in series, resistance means connected in parallel with the fan motors, and voltage responsive means connected between points in the series of fan motors and in the resistance means which are normally at the same potential for effecting deenergization of the fan motors in response to the appearance of a voltage between said points.

6. A heating and ventilating system as defined in claim 5 including temperature responsive means for changing the speed of the fan motors in response to predetermined temperatures in the car.

7. A heating and ventilating system for a car comprising a plurality of electric heaters, a plurality of motor-driven fans for circulating air in the car, a relay on the car, means for energizing said relay, means responsive to energization of the relay for effecting connection of the fan motors to a power source for operation of the fans, said fan motors being connected in series, means responsive to unbalance of the voltages across the fan motors for effecting deenergization of the fan motors independently of the relay, said relay also including contact means for establishing circuits for energizing said heaters from the power source when the relay is energized, temperature responsive means for controlling said energizing circuits to effect energization of the heaters in response to predetermined temperatures in the car, said relay also including contact means for establishing an energizing circuit for at least one of said heaters when the relay is deenergized, and separate temperature responsive means for controlling said last-mentioned energizing circuit in response to a predetermined temperature in the car.

8. A heating and ventilating system as defined in claim 7 including temperature responsive means for changing the speed of the fan motors in response to predetermined temperatures in the car.

References Cited
UNITED STATES PATENTS

| | | | |
|---|---|---|---|
| 326,411 | 9/1885 | Eastman | 236—49 |
| 373,324 | 11/1887 | Wheeler | 236—49 X |
| 1,173,054 | 11/1929 | McQuistan | 236—49 |
| 2,058,252 | 10/1936 | Parsons | 219—276 |
| 2,075,463 | 3/1937 | Parsons | 219—364 |
| 2,201,916 | 5/1940 | Parsons. | |
| 2,256,350 | 9/1941 | Nystrom | 165—42 X |
| 2,424,344 | 7/1947 | Veinott | 318—334 X |
| 2,516,879 | 8/1950 | Huszagh | 236—49 |
| 2,593,094 | 5/1952 | Blue | 98—10 |

ANTHONY BARTIS, *Primary Examiner.*